July 21, 1964  H. RINK  3,141,560
LOADING DEVICE
Filed Sept. 15, 1961
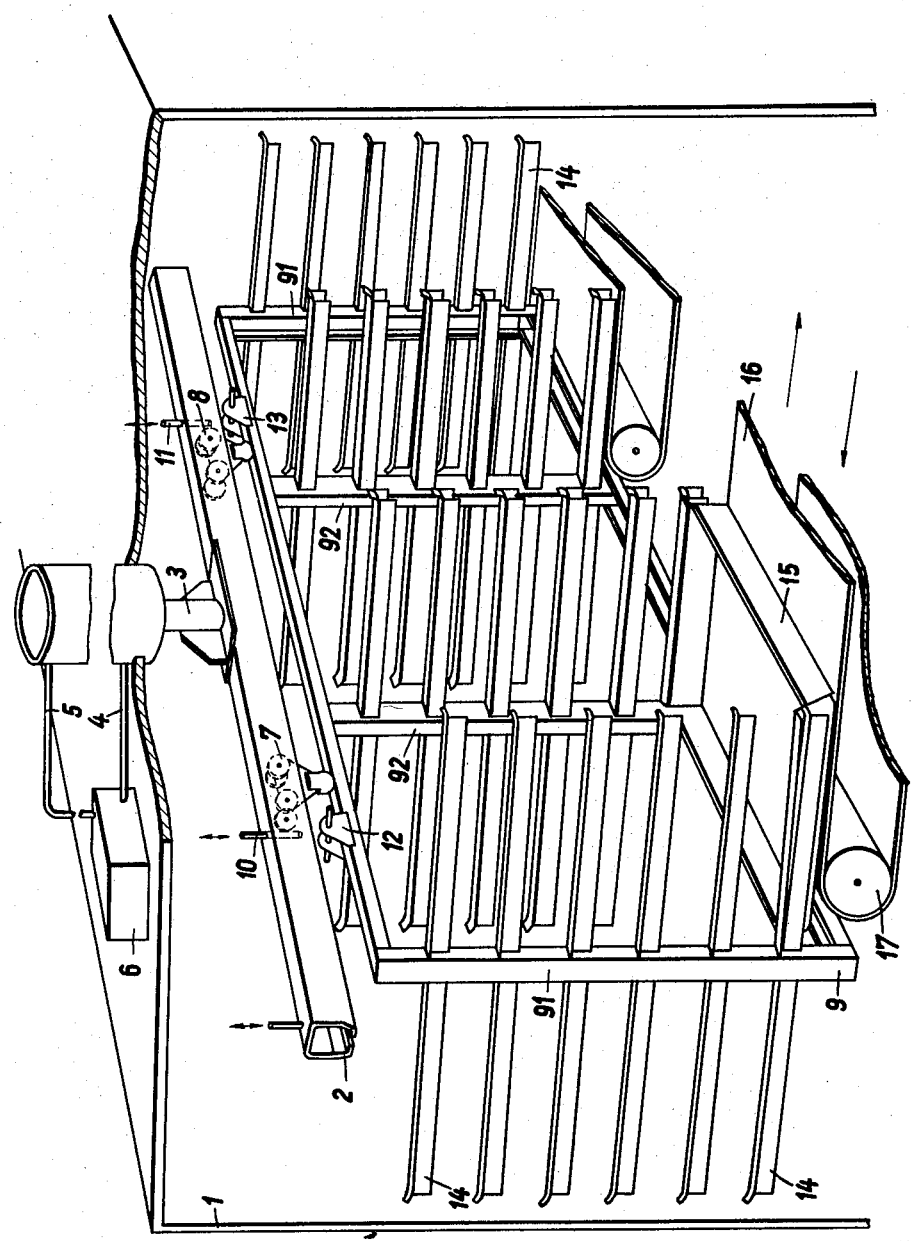
INVENTOR
Helmut Rink
BY *George H. Spencer*
ATTORNEY �
United States Patent Office 3,141,560
Patented July 21, 1964

3,141,560
LOADING DEVICE
Helmut Rink, Bonn, Germany, assignor, by mesne assignments, to Leybold-Anlagen Holding A.G., Zug, Switzerland
Filed Sept. 15, 1961, Ser. No. 138,347
Claims priority, application Germany Sept. 17, 1960
13 Claims. (Cl. 214—89)

The present invention relates generally to loading and unloading devices, and, more particularly, to a device for loading and unloading receiving vessels containing goods, which vessels can be placed in vertical groups on the movable carrier member, or taken off this member, especially an unloading device in plants using the process of continuous vacuum freeze drying.

It is known in this art to fasten containing vessels, in which goods to be dried are located, to a movable carrier element in groups. This element then passes through the various treating chambers of a processing plant and the vessels maintain their proper position during the entire processing operation. At the start of such a process it is necessary to place the vessels in vertically aligned groups on the carrier element, and subsequently at the end of the process they are removed. When these receiving vessels are removed from the carrier element they are conveyed into the working zone of other machines which further process the goods in the containers, e.g., package the goods.

Devices for handling these receiving vessels are of great importance in continuous vacuum freeze drying processes and especially during the discharging or unloading process, because the removal of the goods from the vessels must be done in a vacuum atmosphere or an atmosphere which contains a protective gas, because the goods, after the drying operation, are very hygroscopic. Thus manual removal of the receiving vessels is difficult and may even be considered impossible. The desirable characteristics or properties of the goods which are obtained during the vacuum freeze drying operation can usually only be maintained if the goods are prevented from being contaminated by the atmosphere subsequent to the drying process, since the effect of the atmosphere may destroy the desirable properties of the goods. Preferably, the final packaging is carried out before the goods are transported to the atmosphere.

Accordingly, it is a main object of this invention to provide a simple, yet effective, loading and unloading device for receiving containers in which goods may be disposed and wherein a plurality of dish-shaped receiving containers may be placed onto a carrier element in vertical groups or removed therefrom by mechanical means.

Another object of this invention is to provide a device of the type described wherein mechanical means are provided for loading and unloading receiving vessels whose contents are to be subjected to a vacuum freeze drying process, which device operates in such a manner that goods within the vessels are not exposed to contact with the atmosphere.

These objects and others ancillary thereto are accomplished according to preferred embodiments of the invention, wherein a carrier element is provided for accommodating the receiving vessels and which has an operating mechanism or moving means so that changes of the altitude or vertical position and lateral displacement of the carrier element may take place. The receiving vessels are placed onto the carrier element and removed from it one after the other by means of at least one stationary conveyor belt. The carrier element is provided with holding members for accommodating the vessels, and the width of the conveyor is less than the horizontal distance between the holding members so that conveying may be continued while the carrier element is moved vertically. The lowering movement may be performed continuously or stepwise, and, after the receiving containers of a group disposed in a vertical column have been placed onto or removed from the carrier element, this process is repeated in an adjacent column, by first displacing the entire carrier element laterally of the direction of movement of the conveyor. In this manner, the adjacent groups of vessels which are disposed laterally of each other can be placed onto or removed from the carrier element.

Relatively shallow dishes, which are rectangular in plan, may be used as the receiving vessels. A hydraulic driving means is preferably provided for driving the operating mechanism. The course of movement in two planes may be automatically controlled by a program control device which is known per se.

If a frame-shaped carrier element is used which has dish-shaped receiving vessels arranged, in superposed groups on both sides, on horizontal holding elements, an additional advantage can be realized by so constructing the moving means that the same may carry out a pivotal movement about 180°. In this event, first the receiving vessels on one side of the carrier element will be inserted into position or removed therefrom, and then, after the carrier element is rotated 180°, the containers may be placed onto or removed from the other side of the frame. In this manner, the vessel capacity of a carrier element may be increased.

The device may also be constructed so that the operating mechanism is fastened to a rail member in which corresponding track wheels on the carrier element are guided. Locking means may be provided so that, during the loading and unloading operation, movement of the carrier element with respect to the rail member is prevented.

Additional objects and advantages of the present invention will become apparent upon consideration of the following description when taken in conjunction with the accompanying drawing in which the sole figure is a diagrammatic perspective view of the invention, partially in section.

With more particular reference to the drawing, a portion of a sealed tank 1 is illustrated within which a rail member 2 is fastened to a rotatable and linearly movable hydraulically actuated piston 3. The hydraulic cylinder for the piston 3 is connected with a control apparatus 6 by means of suitable feed conduits 4 and 5. This control apparatus may contain means for automatic program control to consequently automatically control the movements of the device.

A carrier element 9, constructed of frame members, is supported by rail member 2 by means of roller assemblies 7, 8, disposed within an adapted or lateral movement along the rail member 2 which is hollow and provided with a guide opening in the lower end thereof. Roller assemblies 7, 8, may be locked against movement relative to rail member 2 by means of locking bolts 10 and 11. The carrier element 9 is driven longitudinally of the rail 2 in any suitable manner, as, for example, by a chain or rope (not shown) which is connected to holding devices or anchors 12 and 13 fixed to the upper end of the frame carrier member 9.

Pairs of horizontally disposed holding members or cantilever bars 14 are fastened to the frame carrier element 9 along both sides thereof. The cantilever bars are arranged in vertical groups so as to define open passageways therebetween. The upper edges of these bars 14 may support parallel lateral rims which are provided on the receiving vessels 15.

A conveyor belt 16 provided with a stationary guide roller 17 is disposed in the vicinity of carrier element 9.

This conveyor belt is driven by suitable driving members (not shown) in a known manner.

If the device is used for charging or loading, a receiving vessel 15 is first placed onto one top pair of holding bars 14 and then sequentially on each next lower pair of holding bars 14 by moving the piston 3 and supported carrier element in an upward direction. In each case the entire vertical group of superposed pairs of bars are provided with receiving vessels 15 before the carrier element 9 is laterally displaced by movement of the roller assemblies 7, 8 along the rail member 2 to bring the next vertical column of holding bars 14 in alignment with the conveyor belt 16. When loading, the motion of the upper surface of conveyor belt 16 which extends into the open passageway between the pairs of support bars 14 will be toward the frame. The receiving vessels 15 are fed by the conveyor belt 16 toward the carrier element 9, onto arms 14, and they do not stop until they abut against the vertical members 91 and 92 of the frame carrier element 9.

In the discharging operation or removal of the receiving vessels from the carrier element, the conveyor belt 16 will now move in the opposite direction. In this case, the unloading operation will begin in the bottom row of the frame and will proceed upward as the carrier element 9 is moved downwardly by downward movement of the piston 3. Then, the carrier element is laterally displaced along the rail member 2 so as to align the next column with the conveyor belt.

If desired, the frame carrier element 9 is rotated 180 degrees by rotation of the piston 3 and the aforementioned movements are repeated. Particular details of the packaging device which may be possibly connected with the conveyor belt, as well as the arrangement of further treating chambers through which the carrier element may pass, if desired, are not illustrated in the drawing since they are not necessary for an understanding of the loading and unloading device comprising the present invention.

Also, if desired, the entire device may be enclosed within the tank 1 and may thus be substantially sealed from the atmosphere, and an atmosphere of protective gas or vacuum pressure may be maintained. In addition, at least one opening may advantageously be provided in this tank and preferably a transfer or removal device disposed therein for the conveyor belt and the receiving vessels which are carried thereby. In certain fields of application, however, the stationary conveyor belt may be entirely disposed within the sealed tank and convey the goods in the receiving vessels at the end of the treating process, to a packaging device disposed within the tank, the construction of which packaging device is known per se. Only at this time are the goods removed from the tank, and thus they are already completely packed and sealed from the outside or atmospheric air.

If so desired, a plurality of stationary conveyor belts may be provided, as illustrated in the drawing, and which are provided at the same height so as to be disposed laterally of each other. The widths of the conveyor belts substantially correspond to the horizontal distance between the holding bars or members of the carrier element, but must be such that it is possible for the conveyors to pass between the holding members so that the carrier element may be moved vertically with the conveyor belts moving between the individual member comprising a pair.

It will be understood that the above description of the present invention is susceptible to various modifications, changes, and adaptations, and the same are intended to be comprehended within the meaning and range of equivalents of the appended claims.

What is claimed is:

1. In a continuous freeze drying arrangement including a tank sealable from the atmosphere and having a treating section and a charging and discharging section for the entrance and exit of dish-like receiving vessels, and a horizontally and vertically movable tank traversing carrier element arranged for supporting the dish-like vessels in groups one above the other and which may be loaded and unloaded when the carrier element is in the charging and discharging section, the improvement comprising at least one stationary conveyor belt moving in a horizontal direction and independently of said carrier element, said carrier element including support rods cooperable in groups to support the receiving vessels by gravity, means entering into operative connection with the carrier element when it is in said charging and discharging section for selectively moving said carrier element vertically, and moving cooperable groups of rods into position with respect to said conveyor for selectively (1) receiving vessels having their bottom surfaces resting on said conveyor and (2) delivering vessels on said rods to said conveyor solely by the frictional forces between the conveyor and the bottoms of the vessels.

2. A freeze-drying apparatus comprising a vacuum sealable tank, a carrier device adapted to enter and leave said vacuum sealable tank, said carrier device including a plurality of support means arranged one above the other in vertical groups, adjacent vertical groups of said support means forming an open passageway therebetween and adapted to support dish-like receiving vessels in the open passageway between said vertical groups of said support means, conveyor means adapted to provide movement of said dish-like receiving vessels relative to said carrier device, means permitting horizontal movement of said carrier device so as to allow alignment of said conveyor means within the open passageway between said adjacent vertical groups of said support means, means for providing relative vertical movement between said carrier device and said conveyor means in a manner to provide relative movement of said conveyor device through the open passageway between said adjacent vertical groups of said support means.

3. The apparatus according to claim 2 wherein said conveyor device comprises a conveyor belt, means for driving the flat surfaces of said conveyor belt in a substantially horizontal plane, said conveyor belt having a width less than the width of the open passageway between said adjacent vertical groups of said support means so as to allow relative vertical movement of said conveyor belt through the open passageway.

4. The apparatus according to claim 3 wherein said carrier device is adapted for alignment with said conveyor belt in a manner to allow the sequential delivery to said conveyor belt of the individual dish-shaped vessels in a vertical group solely by the frictional force between said conveyor belt and the bottoms of said dish-shaped vessels upon upward movement of said carrier device.

5. The apparatus according to claim 4 including means for permitting 180° rotation of said carrier device whereby dish-shaped vessels can be removed by said conveyor belt from two sides of said carrier device.

6. The apparatus according to claim 5 wherein said means permitting horizontal movement of said carrier device includes a rail member, said carrier device includes guiding wheels movable along said rail member so that said carrier device may move laterally therealong, and means for locking said carrier device to said rail member.

7. The apparatus according to claim 3 wherein said carrier device is adapted for alignment with said conveyor belt in a manner to allow the sequential delivery of individual dish-shaped vessels from said conveyor belt to said carrier device in a vertical alignment solely by gravitational force upon downward movement of said carrier device.

8. The apparatus according to claim 7 including means for permitting 180° rotation of said carrier device whereby dish-shaped vessels can be delivered to two sides of said carrier device with said conveyor means.

9. The apparatus according to claim 8 wherein said means permitting horizontal movement of said carrier device includes a rail member, said carrier device includes guiding wheels movable along said rail member so that said carrier device may move laterally therealong, and means for locking said carrier device to said rail member.

10. The apparatus according to claim 3 wherein said support means forms open passageways on two sides of said carrier device and including means permitting 180° rotation of said carrier device whereby said conveyor means can be aligned with open passageways on two sides of said carrier device.

11. The apparatus according to claim 3 wherein said means permitting horizontal movement of said carrier device includes a rail member, said carrier device includes guiding wheels movable along said rail member so that said carrier device may move laterally therealong, and means for locking said carrier device to said rail member.

12. The apparatus according to claim 2 including means to permit 180° rotational movement of said carrier device whereby said conveyor means can be aligned with two sides of said carrier device.

13. The apparatus according to claim 12 wherein said means permitting horizontal movement of said carrier device includes a rail member, said carrier device includes guiding wheels movable along said rail member so that said carrier device may move laterally therealong, and means for locking said carrier device to said rail member.

References Cited in the file of this patent

UNITED STATES PATENTS

| | | |
|---|---|---|
| 1,599,227 | Gantvoort | Sept. 7, 1926 |
| 2,165,513 | Smith | July 11, 1939 |
| 2,195,816 | Huff | Apr. 2, 1940 |
| 2,419,380 | Van Etten | Apr. 22, 1947 |
| 2,454,706 | McMichael | Nov. 23, 1948 |
| 2,605,004 | Grueneberg | July 29, 1952 |